United States Patent Office 3,151,181
Patented Sept. 29, 1964

3,151,181
HIGH MOLECULAR WEIGHT HYDROCARBON
POLYMERS
William A. Hewitt, Oakland, and Aldo De Benedictis,
Berkeley, Calif., assignors to Shell Oil Company, a corporation of Delaware
No Drawing. Filed Feb. 18, 1958, Ser. No. 715,860
5 Claims. (Cl. 260—683.15)

This invention relates to novel high molecular weight polymers and processes for preparing the same. More particularly, it relates to novel polymers and processes for their preparation from alpha-olefins.

In recent years it has been discovered that alpha-olefins can be reacted in the presence of certain catalysts at rather low temperatures and pressures. The products thereby obtained will vary depending on a number of factors but in general they comprise a mixture of homologues of the starting olefin and polymers. Thus, for example, when applied to ethylene, there may result a polyethylene of distinctive character and/or mixed monomers as butene-1, hexene-1, etc. In addition to producing a distinctive polyethylene, the method provides a means of producing lower alpha-olefins at reduced cost. The versatility of the reaction of the lower alpha-olefin is attributed to certain catalysts which are referred to as "Ziegler" or "low pressure" catalysts. Actually, it is believed that these catalysts are not true catalysts as they participate in the reaction to such a degree that they are not present in the same form as when they were originally present. Therefore, they are more properly reactants but by common usage they are conveniently termed 'catalysts." In view of the finding that they participate in the reaction, it is likely that a multitude of novel products can be prepared by varying all or some of the critical variables in the so-called "Ziegler-reactions." A feature of the novel products of this invention is that they have certain outstanding properties although other polymers which are closely related do not have the same properties.

It is an object of this invention to provide novel polymers and processes for preparing the same. It is another object of this invention to provide polymers of controlled molecular weight and molecular weight distribution. It is still another object to provide novel polymers having controlled high molecular weight and which have a pattern of branched side chains of higher alkyl groups. A further object is to provide efficient processes for the production of the novel polymers of this invention. Other objects will become apparent as the description continues.

These and other objects are achieved by a polymerized alpha-olefin which is substantially linear in structure wherein alternate carbon atoms have alkyl radicals of 10 to 22 carbon atoms dependent therefrom, the polymer having a molecular weight from about 650 to about 1,000,000. It will hereafter appear that the dependent alkyl radicals may be varied as desired but those products having an average side chain of 10 to 14 carbon atoms are more preferred by reason of their utility.

The novel products of this invention have the general formula

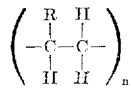

wherein $n$ is an integer and each R is an alkyl radical having from 10 to 22 carbon atoms per molecule. The integer, $n$, is such that when taken in conjunction with the average chain length of the alkyl radicals, R, the average molecular weight of the polymer is between about 650 and about 1,000,000. Thus when R averages 12 carbon atoms, $n$ ranges from about 4 to about 5,000.

The products of this invention may be prepared by any of several processes. Basically, however, the several processes comprise modifications of the process which comprises polymerizing a mono-alpha-olefin of 10 to 22 carbon atoms, or mixtures thereof, at low temperatures and pressures in the presence of a "Ziegler" or "low pressure" catalyst, and a promoter therefor. The mono-alpha-olefins of 10 to 22 carbon atoms may be obtained from any source but it is a particular advantage of the present invention that efficiency is promoted when they are prepared in situ by reacting ethylene at temperatures ranging from about 100° C. to about 250° C. and pressures greater than 500 p.s.i. in the presence of a low pressure catalyst. When the in situ preparation of the higher alpha-olefins is adopted, which for the sake of convenience is referred to here as the "two-step process," the reaction product at the end of the first step comprises a mixture of alpha-olefins, mainly of 10–22 carbon atoms, a minor amount of higher polymer and the catalyst. The second step only requires the addition of the catalyst promoter before polymerization begins.

In general, it is preferred that the process be conducted in the two steps mentioned above. This has the substantial advantage that the starting material, ethylene, is inexpensive and abundant. Another advantage of the two-step process is that the processing costs are not increased as the same apparatus may be used in both steps. A further advantage is that the two steps may be combined to afford continuous operations to produce the products of this invention. As the first step of the two step process results primarily in higher monomeric alpha-olefins for use in subsequent processing, it is of considerable importance that these alpha-olefins be of the proper number of carbon atoms. At this step, the temperature may range from 100 to 250° C. Preferably, however, the reaction is conducted at a temperature of from about 130 to about 170° C. With temperatures in excess of 250° C., the catalyst begins to decompose resulting in undesirable products. At this step, the pressures may range from 500 p.s.i. to 4500 p.s.i. or higher. Preferably, however, the pressure should range from 1000 to 1500 p.s.i. The use of very high pressures, i.e., in excess of 4500 p.s.i., is not detrimental but pressures substantially below 500 p.s.i. result in the production of branched mono-olefins such as 2-ethylbutene-1 and the like. The formation of such branched monomers, in general, is not desirable.

After the first step is effected the reaction products thus obtained are treated to remove the alpha-olefins having less than 10 carbon atoms. This may be accomplished by vaporizing or partial distillation at a temperature of about 172° C. with the latter method being preferred. The residue thus obtained constitutes the starting material for the second step of the two-step process whereby the ultimate products are produced. The conditions of temperature and pressure for the second step are found to be considerably less severe than in the first. Thus, the reaction is found to proceed smoothly at ambient temperatures and pressures upon addition of a catalyst promoter, which is more fully described hereinafter. If desired, elevated temperatures may be used; this constitutes one means of decreasing the molecular weight of the product. Conversely, low temperatures may be used to increase the molecular weight of the product. Ambient temperatures are preferred with temperatures from 0° C. to 25° C. being desirable to obtain the higher molecular weight products of this invention.

As used in the two-step process, the catalyst is initially charged to the reaction vessel to which the ethylene is added. Thereafter, the temperature is raised with the application of pressure. It is always desirable that the reactions be conducted in the presence of an inert hydrocarbon diluent. This affords better mixing and facilitates the removal of the products from the reactor. A diluent is required in continuous operations as better flow of reactants and products is achieved in solution or suspension in the diluent.

From the foregoing description of the two-step process, it will be seen that the reactants at the beginning of the second step may comprise alpha-olefins of 10 or more carbon atoms, some low molecular weight polymer, the catalyst and the promoter. It is substantially the same composition which comprises the starting material for the alternative method of preparing the products of this invention except that the polymer will not ordinarily be present. Thus, instead of treating ethylene at elevated temperatures and pressures, the starting material may be an alpha-olefin of 10 to 22 carbon atoms, or mixtures thereof, irrespective of their source. To such a mixture is added the catalyst and the promoter whereupon polymerization begins. For this method of producing the products of this invention, as in the case of the second step of the two step process, the reaction is most conveniently conducted at ambient temperatures and pressures although temperatures may range as high as about 150° C. or as low as 0° C.

Another process for the production of the polymers of this invention comprises the so-called "block polymer" method, wherein a homopolymer or copolymer is first formed and then is utilized as one component in the further polymerization of additional monomeric material to obtain a final product having the desired molecular weight and an average alkyl side chain of 10 to 14 carbon atoms. For example, dodecene-1 can be polymerized in the presence of a Ziegler catalyst and promoter to obtain a high molecular weight polymer which is then combined with octadecene-1 and the polymerization continued to produce a copolymer wherein a large block consisting of dodecene units is combined with a second large block consisting of octadecene units, the ratio of the two being such that the average number of carbon atoms in the alkyl substituents from alternate carbon atoms in the linear chain is more than 10 and no more than 14 carbon atoms.

As previously indicated, the reactions may be conducted in the presence of inert hydrocarbon diluents. Such diluents include cyclohexane, methylcyclohexane, dimethylcyclohexane, benzene, toluene, pentane, hexane, and the like. Depending on such factors as the temperatures, pressures, and the like, 2 to 12 hours are required for the first step to be completed. The polymerization of the higher alpha-olefins may require only several minutes but it is better to adjust the reaction conditions so that the reaction takes about 30 minutes.

The products of this invention are produced in the presence of a catalyst and a promoter therefor, the two being reaction products. The catalyst is used by itself for the production of the olefins of 10 or more carbon atoms by the first step of the two step process described above. The catalyst is any alkyl aluminum but certain species are preferred such as those of the formula $Al(R)_3$ where the R's are lower alkyl radicals from 1 to 10 carbon atoms. Among the more preferred aluminum alkyls are aluminum trimethyl, aluminum triethyl, aluminum triisobutyl, and the like. These species are more preferred because they are more efficient and/or more economical to use but the invention is not limited to these species for it is known that Ziegler-type catalysts include those of the formula $R_1R_2AlX$ where $R_1$ and $R_2$ are similar or dissimilar and are selected from hydrogen or a hydrocarbon radical and X represents hydrogen, halogen, alkoxy, or aryloxy groups, the residue of a secondary amine, secondary acid amide, mercaptan, thiophenol, carboxylic acid or sulfonic acid, and these types may also be used although they are less preferred. In using the catalyst, it is found to be advantageous to disperse or dissolve it in a small amount of a liquid hydrocarbon diluent before it is charged to the reaction vessel. In the case of the preferred catalyst, i.e., the aluminum trialkyls, caution should be exercised in handling them as they may react violently when exposed to air, oxygen, carbon dioxide and water.

The promoter may be selected from the large group of metals within the "$a$" subgroup of Groups IV to VI of the Periodic Table including titanium, palladium, zirconium, vanadium, chromium, molybdenum, tungsten, and the like. Desirably, salts thereof may be used with advantage such as the chlorides, oxychlorides, and acetonates of titanium and zirconium. Particularly preferred are the chlorides of palladium, zirconium, and titanium with the last being most preferred including such chlorides as titanium trichloride and titanium tetrachloride.

Considering the first step of the two step process, it may be stated that the various amounts of monomers that are formed per unit of ethylene depend largely on the quantity of catalyst present in conjunction with the temperatures and pressures; when greater amounts of the catalyst are present, a lesser portion of the starting alpha-olefin is consumed per unit of cataylst. The amount of the catalyst which can be utilized most efficiently in the first step of the two-step process may be determined by the stoichiometry and the volume of the reaction vessel at the preferred temperatures and pressures. Thus, for example, most desirable yields are obtained when about one gram of catalyst is allowed for about 10 to 50 cc. of reaction space within the reaction vessel. It will readily be understood that these conditions are merely representative of preferred conditions as the volume of the vessel is not a critical factor in the process because the catalyst will be utilized according to the temperature, pressure and reaction times. The quantity of the catalyst may also be computed on the amount of ethylene employed. As a guide the mole ratio of the ethylene to catalyst desirably ranges from 200:1 to 10:1 with a ratio of 100:1 to 25:1 being suitable in most cases. Greater or lesser amounts may be employed as the ethylene will be consumed in relation to the catalyst present and volume of the reactor.

The quantity of the promoter used in the second step of the two-step process, or in the one-step process, is easily computed based on weight of the olefin consumed and is about .5 to 1.5%. In most instances it will be found that the catalyst will range from about 2.0 to 3.0% of the olefin consumed with about 2.5% being preferred and the quantity of the promoter being preferably about 1%. On a molar basis the promoter is preferably present in a lesser amount than the catalyst and may range from about 10:1 to about 1.05:1, with about 5:1 to about 2:1 being better in most cases. Variation in this ratio will have an effect on molecular weight and rates of reaction. In considering the amount of the catalyst and the activator, allowance should be made for impurities contained therein. In the preferred embodiment however, the catalyst, the promoter and the olefin should be free of impurities as they tend to produce products which are markedly less satisfactory.

From the foregoing description of the variables involved in the process, it will be appreciated that the products of this invention may also be varied not only in regard to the molecular weight but also in regard to the number of carbon atoms in the side chains. The products of this invention are particularly useful as additive for lubricating compositions because they improve the viscosity index and act as pour point depressors. In addition the polymers, depending on their molecular weight, have great shear stability. At higher molecular weights, i.e., in the order of about 650,000 and higher the polymer is not as shear stable and it appears that polymers of that molecular weight will be preferentially sheared when the polymer is employed in engine lubricating compositions. The result is that the thickening power of the polymer is somewhat decresaed. This is easily overcome by employing a polymer having a lower molecular weight.

In the preferred embodiment the polymer has a molecular weight in the order of about 10,000 to about 100,000 as that polymer is more shear stable and thus is better in lubricating compositions for automobile and truck engines. The products of this invention are also particularly suitable for lubricating composition for aircraft engines because of their pour point depressing properties. The low molecular weight products, as for example the tetramers, are particularly useful in hydraulic fluids because of their thickening power.

In addition to the above mentioned characteristics, a more desirable polymer is one having a relatively narrow molecular weight distribution within the desired molecular weight range. Such a product has greater shear stability and facilitates quality control. Further, it may permit maximum benefit from a lesser amount of polymer in a particular lubricating composition. While molecular weight control may be achieved by controlling the polymerization temperature, catalyst to promoter ratio, and the like, it is not feasible to control the molecular weight by such means over a very wide range, particularly when the molecular weight of the polymer is less than about 50,000. Accordingly various mechanical means may be used to prepare the lower molecular weight polymer. One such means is by the use of a fuel injector pump whereby the polymer is sheared to produce lower molecular weights. Such a method is suitable but has the disadvantage of being time consuming. It has now been found that polymer of controlled molecular weight and distribution may be easily prepared by conducting the polymerization of the higher olefins, i.e., those having 10 or more carbon atoms, under hydrogen pressure. Using this technique the molecular weight and its distribution will be found to be dependent primarily on the hydrogen pressures rather than the polymerization temperatures. This will be described more fully in Example XIII and it is to be noted that the polymerization under hydrogen pressure does not have any substantial effect on the polymerization yields or conversions. Another outstanding feature of the products of this invention is that they are stable over a long period of time. The polymers of this invention have shown only insignificant changes in molecular weight and viscosity temperature properties on standing at room temperature for over a year.

Various apparatus for the preparation of the products by the above-described process may be used. In general, the reactions should be conducted in an atmosphere of nitrogen or a similarly inert gas. The apparatus should be preferably free of moisture and the reactants should be of high purity. The apparatus for the first step of the two-stage process should be equipped with suitable inlets whereby the ethylene may be fed into the reaction vessel. A pressure gauge is useful for indicating when the first step of the two-stage process is complete as shown when a constant pressure is reached. When alpha-olefins which have 10 or more carbon atoms are used as starting materials, the apparatus should likewise be a closed system that is free of air.

After the products of this invention have been prepared, irrespective of the method, it is desirable to remove the residual catalyst and promoter. This may be accomplished by any of several means. The product may be treated with isopropyl alcohol to kill the unused catalyst and promoter, followed by washings, with agitation, with a lower alcohol such as methanol to remove the residue of the catalyst and promoter. Each washing is followed by centrifuging or filtering with the latter being preferred.

The following examples will illustrate in more detail the various procedures for preparing the products of this invention. However, it will be understood that the examples are merely for the purpose of illustration.

EXAMPLE I

To a pressure vessel mounted on a rocker, having heating and cooling means and an inlet attached through a pressure valve, are charged 110 cc. of benzene and 7.95 grams of aluminum triethyl. The reaction vessel is pressured with 1000 p.s.i.g. of ethylene at a temperature of 150° C. After about 5 hours, the reaction vessel is vented and cooled. The contents of the vessel have the following approximate analysis of mono alpha olefins: $C_8$, 9.7%; $C_{10}$, 10.9%; $C_{12}$, 10.9%; $C_{14}$, 8.3%; $C_{16}$, 8.3%; $C_{18}$, 6.4%; $C_{20-30}$, 32.4%; $C_{>30}$, 15.1%. The octene-1 and lower olefins are separated by fractionation. This operation marks the end of the first step of the two-step process. To 26 grams of the residue, of which about 0.3 gram is the catalyst, contained in a reaction vessel equipped with an agitator are added 25 ml. of cyclohexane and 0.3 cc. of titanium tetrachloride. With gentle agitation a polymer quickly forms. The mixture is allowed to stand for a few hours. Thereafter, 10 cc. of isopropyl alcohol is added to destroy the catalyst. This is followed by agitation for several minutes. A clear opaque product is obtained after washing several times with methanol. It has a molecular weight of about 245,000 and gives an oil with a viscosity index of 138 at 2% concentration in a near 5W base oil. The VI of the base oil is 97 and it has a viscosity of 27.13 cs. and 4.685 cs. at 100 and 210° F., respectively.

In order to establish the effect of temperature and pressure in the first step of the two-step process, a number of experiments were conducted under various conditions. Some of the results conducted in a vessel with a volume of 460 cc. are shown in Table I.

*Table I*

| Exper. | T., ° C. | Pressure, p.s.i.g. | AlEt₃, gms. | C₂H₄ reacted, g./g. AlEt₃/hr. | C₄–C₈, gms. | C₁₀–C₁₈, gms. | C₂₀–C₃₀, gms. | C>₃₀, gms. |
|---|---|---|---|---|---|---|---|---|
| 122 | 130 | 500 | 20.6 | .72 | 104 | 137 | 31 | 4 |
| 131 | 130 | 1,000 | 20 | 1.32 | 11 | 53 | 86 | 107 |
| 153 | 130 | 1,500 | 20 | 2.18 | 20 | 54 | 93 | 146 |
| 110 | 130 | 500 | 10 | .63 | 10 | 60 | 89 | 140 |
| 139 | 130 | 1,000 | 9.0 | 1.39 | 5 | 23 | 35 | 33 |
| 161 | 100 | 1,500 | 41.1 | 0.22 | 13 | 132 | 84 | 3 |
| 142 | 100 | 1,500 | 20 | 0.24 | 3 | 16 | 46 | 274 |
| 117 | 170 | 500 | 10 | 5.36 | 67 | 137 | 66 | 12 |
| 114 | 150 | 500 | 10 | 1.68 | 26 | 95 | 110 | 68 |

From the above, it will be seen that the most desired fractions, i.e., those that have 10 to 18 carbon atoms, are obtained when about 10 grams of catalyst are present at a pressure from 500 to 1000 p.s.i.g. at temperatures ranging from about 130° C. to about 170° C. Table I also indicates that these factors may be varied within a rather wide range with satisfactory yields of desired product. The fractions of 10 and more carbon atoms have added thereto varying amounts of promoters of the type previously described in order to establish the range of promoter required for most desirable results. In order to illustrate another embodiment of the invention, Experiment 122 shown in Table I is described in more detail below.

EXAMPLE II

To a nitrogen filled pressure vessel mounted on a rocker, having heating and cooling means and an inlet attached through a pressure valve, is charged 20.6 grams of aluminum triethyl. The temperature is raised to 130° C.

and maintained at this temperature while the vessel is continuously rocked. A constant ethylene pressure of 500 p.s.i.g. is maintained until the reaction is complete as indicated by the weight of the ethylene feed container. The vessel and its contents are cooled before opening. The contents of the vessel are stripped of material boiling below 170° C. The residue contains alpha-olefins of 10 or more carbon atoms together with the catalyst. Four grams of this residue is added to an ordinary reaction vessel which has been swept with nitrogen; 0.2 cc. of titanium tetrachloride and several ccs. of benzene are then added. After several minutes, a dark precipitate forms accompanied by a slight heat evolution. Thereafter, 10 grams of octadecene-1 is added to the vessel and the mixture is allowed to stand for several hours. The polymer is then slurried with isopropyl alcohol to destroy unreacted catalyst followed by washing with water, filtering and then washing with hot benzene and drying. The product, 5.3 grams, is a solid polymer having a molecular weight of about 100,000. It gives a viscosity index of 127 to a base oil at 2% concentration. The base oil is the same as in Example I.

EXAMPLE III

To 19 grams of product from the first step in Example I, are added 25 ml. of cyclohexane, 11.2 grams of octadecene-1, 9.4 grams of dodecene-1 and .2 cc. of titanium tetrachloride. The reaction vessel is purged with nitrogen and the mixture is agitated for several hours. A black-brown color develops in the mixture. The catalyst is destroyed upon the addition of isopropyl alcohol. The mixture is washed in hot benzene with agitation followed by filtering and washing with methanol. A viscous opaque polymer is separated which has a molecular weight of about 310,000. The base oil of Example I containing 2% of the polymer, has a viscosity of 48.8 cs. at 100° F. and 8.4 cs. at 210° F. and has a viscosity index of 138.

EXAMPLE IV

The procedure of Example II is repeated except that 14 grams of aluminum triisobutyl replaces the aluminum triethyl and 0.3 cc. of titanium tetrachloride is used. The product has a molecular weight of less than 100,000. The viscosity index of a 2% solution in the base oil is 124.

EXAMPLE V

The mixed olefins of 10 and more carbon atoms obtained from the ethylene and aluminum triisobutyl of Example IV are agitated for several hours in an atmosphere of nitrogen, together with 25 ml. of cyclohexane, 11.2 grams of octadecene-1, 9.4 grams of dodecene-1, and .2 cc. of titanium tetrachloride. The characteristic brown-black color develops. The mixture is worked-up in hot benzene and the polymer product is separated as described in Example III. It has a molecular weight of about 420,000, a viscosity of 30.65 cs. at 2% in the 5W base oil at 100° F.

Examples VI through VIII will illustrate the one-step process. It will be noted that the catalyst and the promoter are added together as distinguished from the previous examples where the promoter was added in the second step of the two-step process.

EXAMPLE VI

To a reaction vessel equipped with an agitator and appropriate inlets and outlets for venting with nitrogen are added 23 ml. of cyclohexane, 11.2 grams of dodecene-1, 8.4 grams of octadecene-1, 0.2 cc. of titanium tetrachloride and 0.5 cc. of aluminum triethyl. The vessel is purged with nitrogen and the mixture is gently agitated for several hours at room temperature. After the reaction is complete, the reaction mass, which is a brown-black color, is treated with several ccs. of methanol to destroy the aluminum alkyl catalyst. The mixture is then washed with hot benzene and filtered while hot. Upon cooling, a gelatinous solid is separated which is washed several times with methanol. The product has an off-white opaque color. It has a viscosity index of 101 at 2% concentration in the 5W base oil, a viscosity of 30.65 cs. and 5.07 cs. at 100° F. and 210° F., respectively. The polymer has an average side chain length of 14 carbon atoms and produces a pour point depression of 15° F. at 0.5% by weight in the oil "ET 250 N" at a pour point of +20° F.

EXAMPLE VII

The procedure of Example VI is repeated except that 5.9 grams of dodecene-1 and 16.9 grams of octadecene-1 are used. The product is a waxy solid having an average side chain length of 12 carbon atoms; 0.5% by weight in the oil "ET 250 N" produces a pour point depression of +45° F. at a pour point of +20° F.

EXAMPLE VIII

A terpolymer is prepared using the same procedures except that the following proportions are used: 25 ml. of cyclohexane, 15.2 grams of octadecene-1, 6.75 grams of dodecene-1, 5.6 grams of decene-1, 0.22 cc. of titanium tetrachloride, and 0.5 cc. of aluminum triethyl. The ultimate product is very gelatinous and not as soluble as the product of Example VI. It has a molecular weight of about 430,000, a viscosity index of 142 at 2% concentration of a 5W base oil; the pour point depression at 0.5% by weight in the oil "ET 250 N" is +40° F. at a pour point of +20° F.; the average side chain length is 12 carbon atoms.

EXAMPLE IX

Using the same methods a copolymer of octadecene-1 and octene-1 is prepared in a mol ratio of 3:2. The product has a molecular weight of about 800,000 with an average side-chain length of 12 carbon atoms. A 2% concentration in a 5W base oil gives a viscosity of 68.3 and 11.55 at 100° F. and 210° F., respectively.

Products having the same configuration as those prepared by the two-step and one-step processes may be obtained by the so-called "block-polymers." This is illustrated by Example X.

EXAMPLE X

To an air-tight reaction vessel equipped with an agitator, heating and cooling means, and appropriate inlets and outlets, are charged 25 cc. of cyclohexane, 11.2 grams of dodecene-1, 0.5 cc. of aluminum triethyl and 0.2 cc. of titanium tetrachloride. The mass is agitated in a nitrogen atmosphere for 3 hours at 25° C. Thereafter, 9.4 grams of octadecene-1 is added and the mixing is continued for several more hours. The product has a molecule weight of about 110,000 wherein the overall side chain averages 12 carbon atoms. A concentration of 0.5% by weight in the oil "ET 250 N" produces a pour point depression of +30° F. at a pour point of +20° F.

EXAMPLE XI

The procedures of Example X is repeated in several experiments wherein the mole ratios of the dodecene and the octadecene are varied. It is found that such variation has the effect of varying the average number of carbon atoms in the side chains.

EXAMPLE XII

The procedure of Example X is repeated using equimolar amounts of eicosene-1 and tetradecene-1. In this case the side chain has an average of 14 carbon atoms. In companion experiments lesser amounts of the tetradecene-1 is used resulting in a lessening of the average number of carbon atoms in the side chains.

In a manner similar to those described above, other catalysts such as aluminum trioctyl, aluminum tributyl, aluminum dimethyl chloride, and the like, may be used. Similarly, the promoter may be selected from those such as palladium tetrachloride, titanium acetonate, zirconium tetrachloride, titanium subhalides, titanium oxychloride, vanadium trichloride, and the like. The products thereby produced will be analogous to those in the above examples.

The following examples illustrate the techniques using hydrogen pressure to control molecular weight.

EXAMPLE XIII

To a four gallon autoclave is charged 1800 gms. of n-heptane, 428 gms. of octadecene-1, 572 gms. of dodecene-1, 21.7 gms. of triethyl aluminum and 10.2 gms. of titanium tetrachloride, the last two being added as solutions in a small amount of n-heptane. The autoclave is purged with nitrogen and then pressured with hydrogen at a predetermined level. The polymer is worked up as indicated in the above examples. The following indicates the average molecular weights obtained at the indicated pressures.

| Hydrogen in lbs: | Av. mole. wt. |
|---|---|
| 15 | 240,000 |
| 40 | 100,000 |
| 70 | 70,000 |
| 100 | 800–1,000 |

It is found that the polymers of Example XIIII are substantially free of polymer having molecular weights in excess of about 500,000 which is the principal factor contributing to improved shear stability as indicated in the following examples.

EXAMPLE XIV

In this example lubricating compositions are prepared as indicated and the lubricant is used in a Cadillac engine operating under simulated highway driving conditions at 70 m.p.h.

7.5% of a polymer of this invention having an average side chain of 12 carbon atoms and a molecular weight of about 240,000 is mixed with di-2-ethyl sebacate. After 24 hours the composition retains 79% of its thickness and 70% of its thickness after 100 hours both at 100° F. At 212° F., 77% and 70% of the thickness remains after the 24 and the 100 hours, respectively. A similar composition having a molecular weight of about 500,000 and a wider distribution of molecular weights, including some in the order of 1,000,000, is prepared using about 5% of polymer in a 5W base oil. The polymer at 5%, by weight, has about the same thickening power as the polymer at 7.5% used above. After 100 hours in the Cadillac engine 22% of the thickening power remains. A lubricating composition is prepared using 1.5%, by weight, of a polymer having a molecular weight average of about 700,000 in a high quality 10W–30 multigrade oil. Under the same simulated conditions only 40% of the thickening power remains after 16 hours. In a series of test compositions, using polymers of this invention, it is found that greatest shear stability is obtained with molecular weights below 100,000 and preferably between 25,000 and 75,000. Most preferred are those polymers prepared in the presence of hydrogen as those polymers appear to be free of polymer having very high molecular weights.

In the examples the molecular weights are given as average figures. The molecular weights in Example XIII are determined by ebulliscoping in benzene. Accordingly it will be appreciated that allowance for inherent errors in the method should be made. More accurate determination is afforded by light scattering methods for the higher molecular weight polymers.

From the foregoing it will be seen that the processes of this invention are capable of numerous modification not only in regard to the reaction conditions but also in regard to the quantities of reactants used. Such modification will be readily understood by persons skilled in the art.

This application is a continuation-in-part of copending application Serial No. 606,566, filed August 28, 1956, now abandoned.

We claim as our invention:

1. A copolymer of octadecene-1 and dodecene-1, said copolymer being substantially linear in structure wherein alternate carbon atoms in the structure have alkyl substituents having an average side chain length of more than 10 and no more than 14 carbon atoms, the polymer having a molecular weight in the range from about 650 to about 1,000,000.

2. A process for the preparation of substantially linear polymers wherein alternate carbon atoms in the structure have alkyl substituents averaging between 10 and 22 carbon atoms, the molecular weight being in the range from about 650 to 1,000,000, which comprises polymerizing ethylene at a temperature in the range from about 100° C. to about 250° C. and a pressure greater than 500 p.s.i. in the presence of an inert hydrocarbon solvent and an aluminum compound of the formula $R_1R_2AlX$ wherein $R_1$ and $R_2$ are selected from the group consisting of hydrogen and alkyl, X is selected from the group consisting of hydrogen, halogen, alkoxy, aryloxy, the residue of a secondary amine, secondary acid amide, mercaptan, thiophenol, carboxylic acid and sulfonic acid and compounds wherein $R_1$, $R_2$ and X are alkyl for a sufficient time to produce a product containing a substantial proportion of $C_{10}$ to $C_{18}$ alpha monoolefins, removing from said product substantially all alpha olefins of less than 10 carbon atoms per molecule, adding to the remaining mixture a catalyst promoter consisting of a metal salt selected from the group consisting of chlorides, oxychlorides and acetonates of a metal selected from the A sub-group of Groups IV to VI of the Periodic Table, whereby in the mixture there is produced a catalyst consisting of the reaction product of said aluminum alkyl compound promoted by said metal salt, continuing the polymerization at a temperature in the range from 0° to 150° C. for a sufficient time to produce said substantially linear polymer of 650 to 1,000,000 molecular weight and recovering said polymer.

3. A process for the preparation of substantially linear polymers wherein alternate carbon atoms in the structure have alkyl substituents averaging between 10 and 22 carbon atoms, the molecular weight being in the range from about 650 to 1,000,000, which comprises polymerizing ethylene at a temperature in the range from about 100° C. to about 250° C. and a pressure greater than 500 p.s.i. in the presence of an inert hydrocarbon diluent and an aluminum trialkyl in which the alkyl groups have from 1 to 10 carbon atoms for a sufficient time to produce a product containing a substantial proportion of $C_{10}$ to $C_{18}$ alpha monoolefins, removing from said product olefins of less than 10 carbon atoms per molecule, adding to the resulting mixture titanium tetrachloride and continuing polymerization at a temperature in the range from 0° to 150° C. for a sufficient time to produce said polymer of 650 to 1,000,000 molecular weight and recovering said polymer.

4. The process of claim 3 in which the aluminum trialkyl is aluminum triethyl.

5. The process according to claim 3 wherein a sufficient pressure of hydrogen is maintained during the second polymerization step to result in a production of a polymer whose molecular weight is largely in the range between 650 and 100,000.

References Cited in the file of this patent

UNITED STATES PATENTS

| 2,500,163 | Garwood | Mar. 14, 1950 |
| 2,781,410 | Ziegler et al. | Feb. 12, 1957 |
| 2,839,518 | Brebner | June 7, 1958 |
| 2,865,903 | Seed | Dec. 23, 1958 |
| 2,899,413 | Hagemeyer et al. | Aug. 11, 1959 |

FOREIGN PATENTS

| 533,362 | Belgium | May 16, 1955 |
| 538,782 | Belgium | Apr. 2, 1956 |

UNITED STATES PATENT OFFICE
CERTIFICATE OF CORRECTION

Patent No. 3,151,181 September 29, 1964

William A. Hewett et al.

It is hereby certified that error appears in the above numbered patent requiring correction and that the said Letters Patent should read as corrected below.

In the grant, line 1, and in the heading to the printed specification, line 4, for "William A. Hewitt", each occurrence, read -- William A. Hewett --.

Signed and sealed this 16th day of February 1965.

(SEAL)
Attest:

ERNEST W. SWIDER
Attesting Officer

EDWARD J. BRENNER
Commissioner of Patents